Aug. 28, 1951 — T. G. CRIDER — 2,565,950
VALVE FOR REFRIGERANT COMPRESSORS
Filed Aug. 5, 1946 — 4 Sheets-Sheet 1

INVENTOR.
THOMAS G. CRIDER.
BY
Barnes, Kisselle, Laughlin & Raisch
ATTORNEYS.

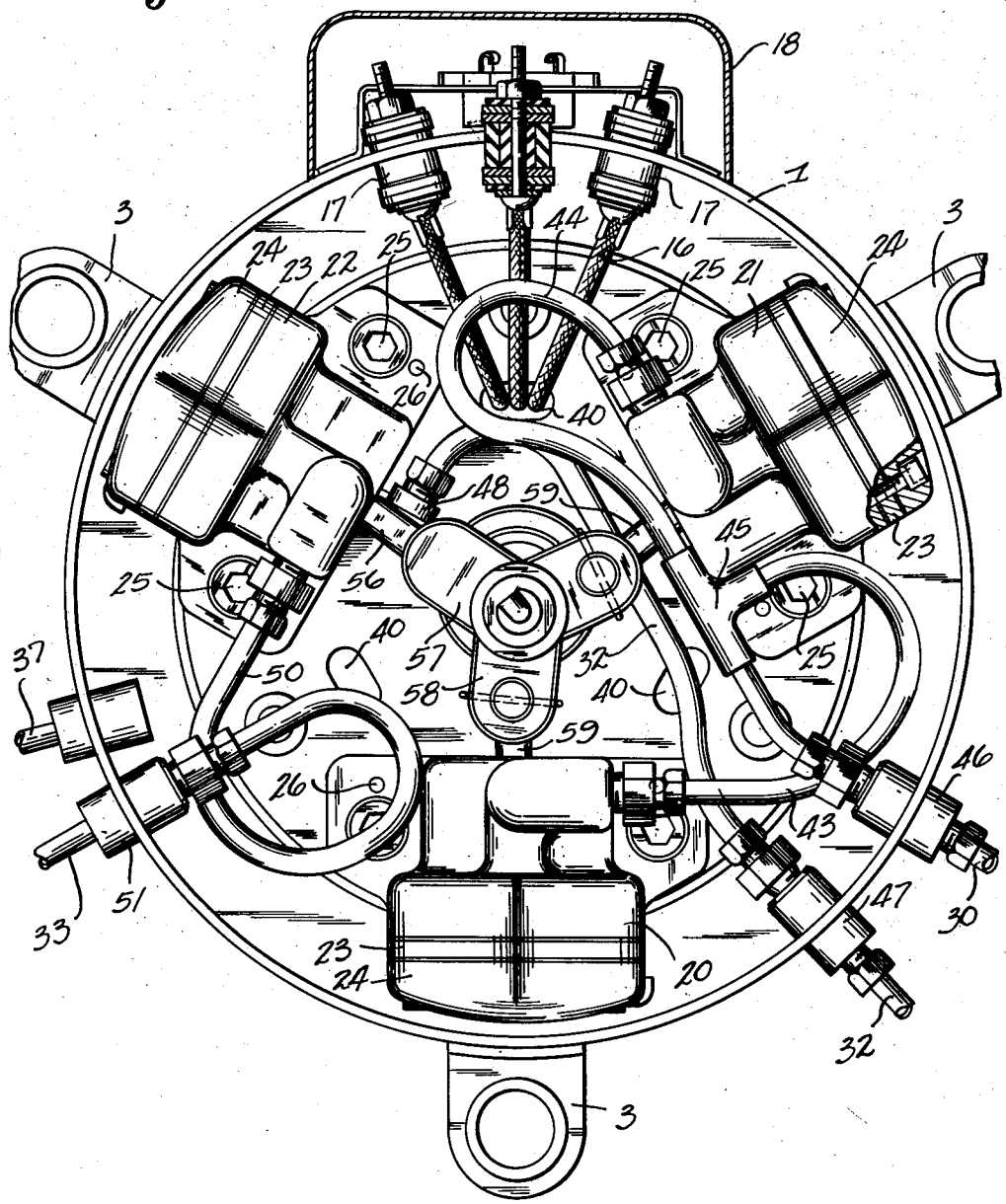

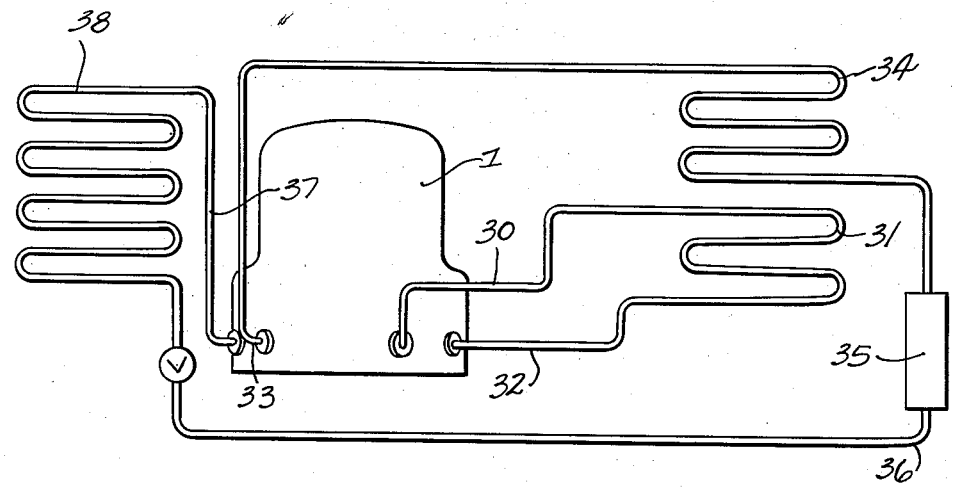
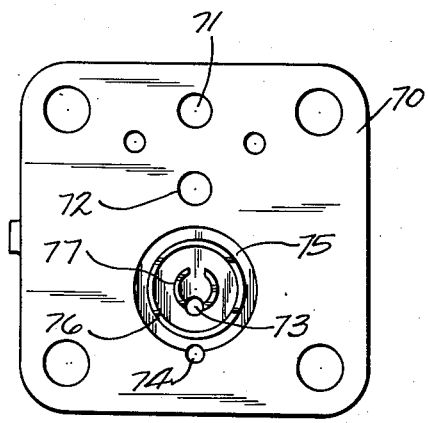
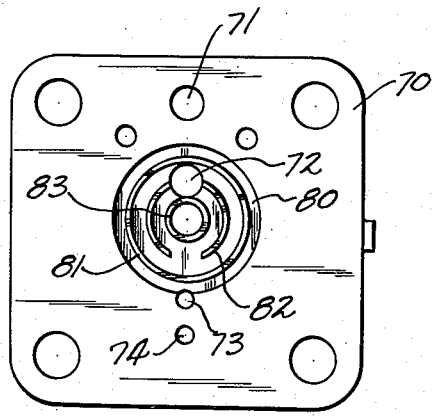

Aug. 28, 1951 — T. G. CRIDER — 2,565,950
VALVE FOR REFRIGERANT COMPRESSORS
Filed Aug. 5, 1946 — 4 Sheets-Sheet 4

INVENTOR.
THOMAS G. CRIDER.
BY
Barnes, Kisselle, Laughlin & Raisch
ATTORNEYS.

Patented Aug. 28, 1951

2,565,950

UNITED STATES PATENT OFFICE 2,565,950

VALVE FOR REFRIGERANT COMPRESSORS

Thomas G. Crider, Lima, Ohio, assignor to The Crider Corporation, Lima, Ohio, a corporation of Ohio Application August 5, 1946, Serial No. 688,537

3 Claims. (Cl. 251—119)

This invention relates to a refrigerant compressor and it has to do particularly with a compressor of a heavy duty-type and especially one for attaining low temperatures as are encountered in deep freezers or other freezing apparatus.

While some of the features of the invention may be employed in compressors other than the heavy duty type, the one selected for purposes of disclosure, is of this type and more specifically it is a two-stage compressor. In such compressors for obtaining particularly low temperatures, there is a wide differential of pressures encountered which promotes low volumetric efficiency. To meet this situation, the compressor of the present invention is of the two-stage type in that there are two compression stages. This splits up the wide overall differential into stages and increases the volumetric efficiency of the compressor. By splitting the compression function into stages, a high efficiency is obtained. In other words, for the same displacement rating a higher B. t. u. rating is obtained with a reduction of power input.

Further objects of the invention include novel valving means for promoting efficient operation and silence in operating and structural features which facilitates the manufacture of compressor units of this type. A still further object is the provision of means which may be termed a pump for forcibly furnishing lubricating oil to moving parts. This pump involves no moving parts in and of itself and accordingly can be cheaply made and has an indefinite life period.

Fig. 2 is a view looking into the shell from the bottom of Fig. 1 with the bottom plate removed.

Fig. 3 is a diagrammatic view showing the refrigerating system of the two stage variety.

Fig. 4 is an elevational view of one side of a valve plate.

Fig. 5 is a view showing the opposite side of the valve plate.

Figure 1:
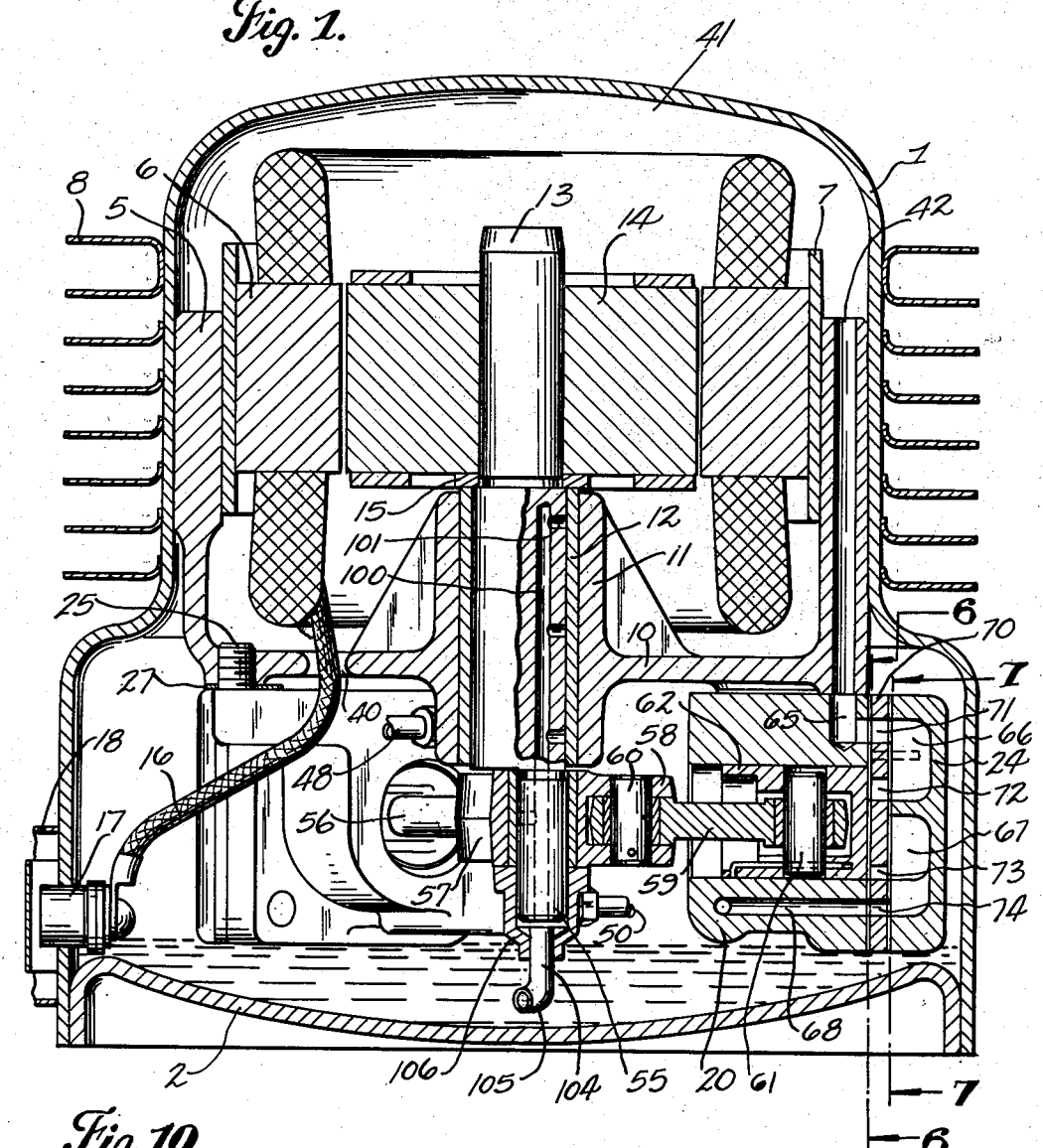
Fig. 1 shows a cross sectional view of a compressor constructed in accordance with the invention and illustrating the enclosing shell, some of the operating parts, and the lubricating system.

As shown in Fig. 1, the compressor embodies an exterior shell 1 with a bottom closure plate 2 and mounted on the exterior thereof are suitable supporting elements 3 by means of which the shell may be carried. Within the shell is a body member preferably in the form of a casting having a ring portion 5 tightly fitted within the shell 1 and which is arranged to receive the stator 6 of a driving electric motor. For this purpose, a second supporting collar or ring 7 may be employed. The exterior of the shell may be arranged to be cooled and for this purpose radiating fins 8 are applied to the exterior.

The body member has a wall or web portion 10 which carries a bearing support 11 which may be lined with suitable bearing material 12 in which the shaft 13 of the motor armature 14 is journalled as indicated. A thrust washer is shown at 15 to carry the vertical load.

The web 10 is provided with apertures 40 one of which may be employed for the passage therethrough of conductors 16 extending to the motor and the conductors may pass out through the shell by means of plugs 17, as shown in Fig. 2. The electrical connections may be protected on the exterior by a protecting cover 18.

Mounted underneath the web 10 and secured thereto are a plurality of cylinders arranged about the axis of the driving shaft. As shown in Fig. 2, there are three of such cylinders illustrated at 20, 21 and 22, each of which is provided with a valve plate 23 and a head 24 held thereto by cap screws as indicated by the cut portion on cylinder 21. The body of each cylinder is constructed independently and are bolted to the underside of the body casting by bolts or cap screws 25. The separate construction facilitates enlarging manufacturing tolerances so that the cylinders may be positioned and lined up properly for the reception of their pistons. In other words, the bolts 25 pass through the apertures in the cylinder bodies with some looseness or clearance as is the usual fashion, and after a cylinder is properly positioned, it is accurately held in this position by means of dowel pins 26, one positioned preferably adjacent each bolt and then the cap screws 25 may be tightened. If necessary, the cylinder bodies may be shimmed relative to the body casting as indicated by the shim 27 (Fig. 1).

Referring now to Fig. 3, a two-stage system is shown. Following this system through with the flow of the refrigerant, the partially compressed refrigerant passes out from the compressor through conduit 30 and through a condenser 31 and back into the compressor through conduit 32. The condenser 31 may be part of the whole condenser employed. The fully compressed refrigerant passes out through conduit 33 to a condenser or condenser portion 34 thence into a receiver tank 35. The receiver tank 35 may or may not be employed as some systems employ a receiver tank and others do not, but the condensed refrigerant is then conducted through conduit 36 to an evaporator 38 and the expanded gaseous refrigerant returns to the compressor through conduit 37.

The three cylinders are arranged to handle the refrigerant in this two-stage manner. The gaseous refrigerant entering the compressor enters freely into the shell 1 as Fig. 2 is viewed. This refrigerant passes upwardly through the web 10 and particularly through the apertures 40 provided therein (Fig. 2) with continued flow upwardly between the stator and the armature of the motor into the compartment 41 in the top of the shell. For two of the cylinders such as the cylinders 20 and 21, the gaseous refrigerant now passes downwardly through passages 42 formed in the body casting. It will be understood that each cylinder 20 and 21 is provided with an inlet passage 42. For the moment, we shall merely assume that the refrigerant passes through the cylinders and is compressed thereby leaving the detailed description to follow and will continue with the path of the refrigerant through the conduits provided therefor. The refrigerant gases entering the cylinders 20 through inlet 42 is compressed thereby and in compressed form is discharged through a conduit 43. The refrigerant gases which enter the cylinder 21 in a similar manner is compressed and discharged through a conduit 44. These two discharge conduits are coupled together as by means of a fitting 45 and the conduit 30 passes through the shell 1 as at 46 and connects to the fitting as shown. Thus, the cylinders 20 and 21 operate in parallel both receiving refrigerant from within the shell and discharging the same into the common line 30. This compressed refrigerant passes through the condenser section 31 and back into the shell through line 32 which passes into the shell at 47. This conduit 32 passes directly into the cylinder 22 and thus keeps the partially compressed refrigerant separate from the refrigerant gases within the shell. The line 32 connects into the inlet of the cylinder 22 by a suitable fitting 48. This partially compressed refrigerant is now further acted upon and further compressed by cylinder 22 and it is discharged into a conduit 50 which passes out through the shell at 51 and connects to line 33.

The pistons of the three cylinders are operated from a single crank 55 on the motor shaft. There is a master connecting rod 56 mounted on the crank for operating the piston in one cylinder as shown in Figs. 1 and 2 and this master crank has a hub 57 formed with wings 58 to which secondary cranks are journalled. There is a secondary crank 59 for the piston of each of the other cylinders connected to the hub 57 as at 60 and, as illustrated in Fig. 1, connected to the piston in the cylinder by a wrist pin 61. The piston in cylinder 20 is illustrated at 62 and since all the pistons are the same only one need to be shown. It will be appreciated by those skilled in the art that rotation of the shaft reciprocates the pistons in their respective cylinders.

The refrigerant in gaseous form for cylinders 20 and 21 is drawn through the inlet passages 42. As shown in Fig. 1, the cylinder 20 has a passage 65 which communicates with passage 42. The head 24 is formed with an intermediate partition to provide an inlet passage 66 and an outlet 67 which communicates with an outlet passage 68 which connects to the outlet line 43. The cylinder 21 is similarly constructed with its outlet passage to outlet conduit 44.

Between the head and the body of each cylinder is a valve plate 70, as shown in Figs. 4 and 5. This plate is apertured at its corners for the passage of the securing bolts. The plate has an aperture 71 which lines up with the inlet passages 65 and 66, as shown in Fig. 1; an inlet passage 72 leading into the cylinder from passage 66; an outlet passage 73 leading from the cylinder to outlet passage 67 and a passage 74 which lines up with the outlet passage 68 as shown in Fig. 1. The top side of the plate is formed with a recess 75 in which is a rim-like seat 76 extending around the outlet port 73 and a partial seat 77 through which the port 73 cuts. On the underside of the plate is a recess 80 in which is a circular rib 81 providing a seat, a second supporting rib 82 which is incomplete and intersects the inlet port 72, and an inner complete ring seat 83. It will be observed that the inlet port 72 is eccentrically disposed relative to the recess 80 and the seats 81, 82 and 83. The surfaces of the ring-like seats are preferably all in the same plane and in the plane of the face of the plate. Also, to be noted, the outlet port 73 is eccentrically disposed in its recess.

The suction or inlet valve fits over the underside of the valve plate and it is in the form of a thin plate 86 accurately located by pins 87 and having a port 71a to line up with the port 71 in the valve plate. In its central portion the plate 86 is cut away to provide a flexible sealing head 90 joined to the body of the valve plate by relatively narrow flexing portion 91 and the plate 86 has apertures 73a and 74a for lining up with the ports 73 and 74 of the valve plate. The head 90 seats on the seat 81, the support 80 and the seat 83 and thus covers the port 72.

Figure 10:
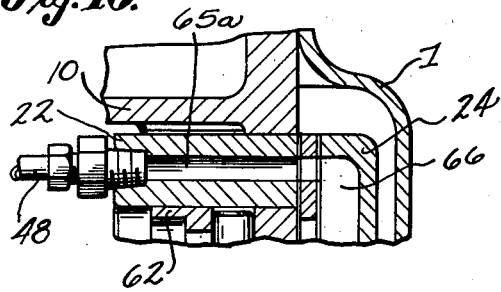
Fig. 10 is a cross sectional view illustrating the inlet structure of one of the cylinders.
Figure 8:
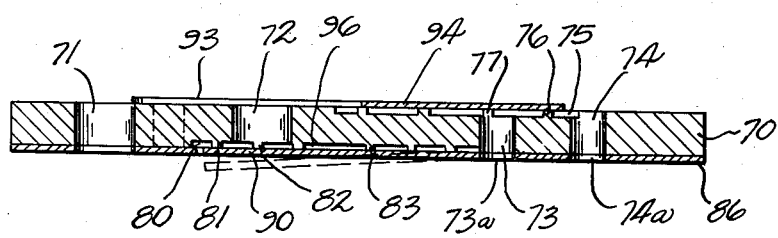
Fig. 8 is an enlarged cross sectional view taken substantially on line 8—8 of Fig. 7 showing the valve plate with the valve members applied thereto.

The discharge valve is mounted on top of the valve plate 70. It has two spaced arms 93 secured to the valve plate by the pins 87 and the two spaced arms provide clearance for the port 72. It has an enlarged head 94 which seats upon the rib 76 and support 77 and closes the discharge port 73. It will be noted, with reference to Fig. 8, how the head 94 seals against the complete circular seat 76 to close the port 73 while the partial ring 77 provides added support. The plate 86 which is mounted underneath the valve plate 70 seats on the circular seat 81 to seal the port 72. The sealing portion 90 is additionally supported by the broken ring 82 while the inner small complete supporting rib 83 forms an oil trap chamber 96. The valve plate and valve structure for each of the three cylinders may, and preferably are, identical. However, the inlet for the cylinder 22, which is directly connected to the conduit 30 at 48 is of a different construction than the inlet for the cylinders 20 and 21. As shown in Fig. 10, the cylinder 22 has an inlet passage 65a for direct connection with the fitting 48. Thus, this cylinder does not have an inlet opening into the shell.

Figure 6:
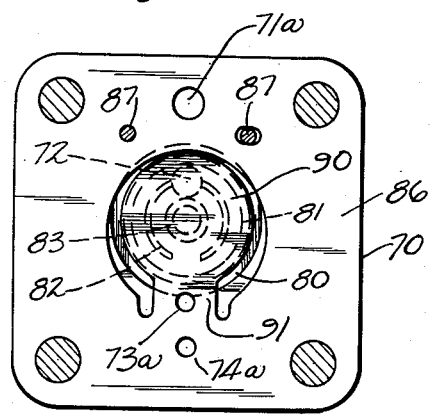
Fig. 6 is a view illustrating the inlet valve member as applied to the valve plate, the view being taken substantially on line 7—7 of Fig. 1.
Figure 7:
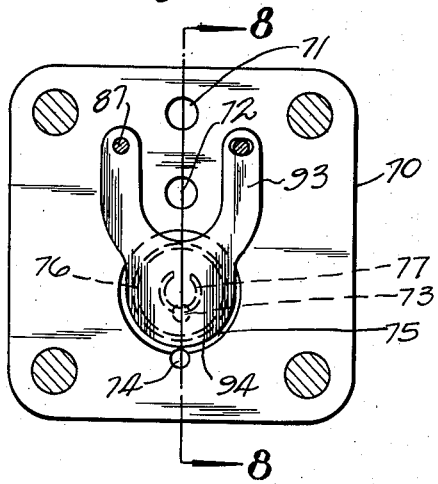
Fig. 7 is a view showing the discharge valve member applied to the valve plate, the view being taken substantially on line 7—7 of Fig. 1.

In the operation of each piston, the down stroke thereof draws the gases in through the inlet port 65 or 65a and 66 and thence through the port 72 in the valve plate. In this action, the valve head 90 flexes to open the port as indicated by the dotted lines. On the up stroke of the piston the valve head 90 closes the inlet port 72 and the compressed gases are discharged through the port 73. In this action the valve head 94 flexes away from the valve port 73 to open the same. Quietness of operation is promoted by this construction. The inlet port 72 is not centrally positioned relative to the valving head 90 as will be clearly seen by reference to Figs. 6 and 8. When this inlet valve opens, the action can be likened to peeling the head 90 off of its seat around the port 72. In the closing action, some oil may be trapped in the recess 96 thus further facilitating silence in function. In a similar manner, the discharge valve is peeled from its seat 76 to open the port 73 but it is thought that no oil trap is needed for the discharge valve.

Figure 9:
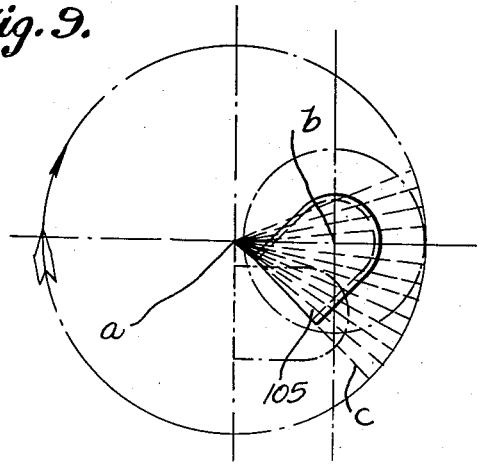
Fig. 9 is a diagrammatic view illustrating the structure and the function of the pump.

The pump construction is illustrated in Figs. 1 and 9. The motor shaft is bored to provide a passage 100 with one or more oil outlets 101 leading to the bearing surface. The passage 100 extends through the crank throw 55 with a passage leading to its bearing as indicated. Mounted on the end of the crank throw 55 is a tube 104 with an angularly disposed end 105. This tube may be concentric with the crank throw 55 and may be held by a fitting 106 attached to the end of the crank throw.

This tube, therefore, operates or rotates about the axial center of the crank shaft. As shown in Fig. 9, the center of rotation of the motor shaft is at a, while the center of the crank throw is at b. Considering Fig. 9, the direction of rotation is clockwise and the open end of the tube scoops up the oil in this movement. A pressure head is established which forces the oil up through the passage 100 for lubricating purposes. The open end of the tube is, of course, situated under the normal oil level as indicated. Now, it will be appreciated that in such rotation about the axis a, that centrifugal force is set up. The lines of centrifugal force are intended to be demonstrated in Fig. 9 by the lines c, these lines radiating from the center of rotation a. Heretofore, pressure head tubes were required to overcome centrifugal force and, therefore, since the centrifugal force increases with the square of the speed such devices were operative only below critical speeds since they would not function when centrifugal force overcomes the pressure head. However, with the arrangement shown herein, it is not necessary to overcome centrifugal force. In fact, the tube 105 may have its open end so constructed and positioned that the centrifugal force has a component aiding the flow of oil into the open end of the tube. This is clearly indicated in Fig. 9. Thus, this pumping device can be operated at any speed of rotation with the insurance that oil will be pumped into the conveying passages.

I claim:

1. A valve structure for a refrigerant compressor having a cylinder with an operating piston therein and a head for providing inlet and outlet passages from the cylinder, comprising a valve plate positionable between the cylinder and the head, said valve plate having an inlet port and having a recess surrounding the inlet port with the inlet port positioned eccentrically thereof, a valve seat in the form of a rib positioned in the recess and extending around the inlet port eccentrically, a flexible valve member assembled with the valve plate and arranged to seat on the rib to seal the inlet port, and another rib in the recess against which the valve member is adapted to seat, said rib providing a chamber closed by the flexible valve member for the trapping of oil to cushion the action of the valve member in seating on the ribs.

2. A valve structure for a refrigerant compressor having a cylinder with an operating piston therein and a head for providing inlet and outlet passages from the cylinder, comprising a valve plate positionable between the cylinder and the head, said valve plate having an inlet port and having a recess surrounding the inlet port with the inlet port positioned eccentrically thereof, a valve seat in the form of a rib positioned in the recess and extending around the inlet port eccentrically, a flexible valve member assembled with the valve plate and arranged to seat on the rib to seal the inlet port, and another rib in the recess and substantially concentric thereof against which the valve member is adapted to seat, said rib providing a chamber closed by the flexible valve member for the trapping of oil to cushion the action of the valve member in seating on the ribs.

3. A valve structure for a refrigerant compressor having a cylinder with an operating piston therein and a head for providing inlet and outlet passages from the cylinder, comprising a valve plate positionable between the cylinder and the head, said valve plate having an inlet port and having a recess surrounding the inlet port with the inlet port positioned eccentrically thereof, a valve seat in the form of a rib positioned in the recess and extending around the inlet port eccentrically, a flexible valve member assembled with the valve plate and arranged to seat on the rib to seal the inlet port, another partial rib within the recess which intersects the inlet port to provide additional support for the valve member, a third rib within the partial rib positioned substantially concentric in the recess and providing an oil trapping chamber for cushioning the action of the valve member.

THOMAS G. CRIDER.

REFERENCES CITED

The following references are of record in the file of this patent:

UNITED STATES PATENTS

| Number | Name | Date |
| --- | --- | --- |
| 919,036 | Langer | Apr. 20, 1909 |
| 1,669,889 | Andrews | May 15, 1929 |
| 1,986,831 | Valley | Jan. 8, 1935 |
| 2,001,885 | Ohmart | May 21, 1935 |
| 2,012,704 | Anderson | Aug. 27, 1935 |
| 2,019,747 | Taylor | Nov. 5, 1935 |
| 2,117,468 | Wolcott | May 17, 1938 |
| 2,138,093 | Feldbush et al. | Nov. 29, 1938 |
| 2,302,447 | King et al. | Nov. 17, 1942 |
| 2,379,667 | Vollmer | July 3, 1945 |